US007162334B2

(12) United States Patent
Yamaguchi et al.

(10) Patent No.: US 7,162,334 B2
(45) Date of Patent: Jan. 9, 2007

(54) REMOTE CONTROL SYSTEM AND TRANSMITTER AND DRIVE FOR THE SAME

(75) Inventors: Takashi Yamaguchi, Tokyo (JP); Jingo Wada, Tokyo (JP)

(73) Assignee: Konami Corporation, Tokyo (JP)

( * ) Notice: Subject to any disclaimer, the term of this patent is extended or adjusted under 35 U.S.C. 154(b) by 449 days.

(21) Appl. No.: 09/989,291

(22) Filed: Nov. 20, 2001

(65) Prior Publication Data

US 2004/0039495 A1 Feb. 26, 2004

(30) Foreign Application Priority Data

Jul. 17, 2001 (JP) ............................ 2001-217304

(51) Int. Cl.
*G06F 17/00* (2006.01)

(52) U.S. Cl. ........................................................ 701/2

(58) Field of Classification Search ................ 701/1–2, 701/36, 49; 246/44, 46; 340/825.06
See application file for complete search history.

(56) References Cited

U.S. PATENT DOCUMENTS 3,639,755 A 2/1972 Wrege
4,137,522 A 1/1979 Stein
4,207,569 A 6/1980 Meyer
4,334,221 A 6/1982 Rosenhagen et al.
4,335,381 A 6/1982 Palmer
4,723,737 A 2/1988 Mimoum
5,077,547 A 12/1991 Burgmann
5,334,076 A 8/1994 Shinozuka
5,355,525 A 10/1994 Lindmayer et al.
5,749,547 A 5/1998 Young et al.
5,781,143 A 7/1998 Rossin
5,885,159 A 3/1999 DeAngelis
5,896,017 A 4/1999 Severson et al.
6,037,858 A * 3/2000 Seki .......................... 340/5.23
6,039,291 A 3/2000 Dobson, IV
6,175,784 B1 * 1/2001 Jicha et al. .................. 701/19
6,270,040 B1 8/2001 Katzer
6,346,047 B1 2/2002 Sobota et al.
6,661,351 B1 12/2003 Matsuhiro
2001/0020430 A1 9/2001 Lenz
2003/0016138 A1 1/2003 Nagata et al.
2004/0039495 A1 2/2004 Yamaguchi et al.

FOREIGN PATENT DOCUMENTS

DE 36 18 464 12/1987
FR 2 727 553 5/1996
GB 2 350 919 12/2000
JP 01-147998 * 9/1989

(Continued)

*Primary Examiner*—Thu V. Nguyen
(74) *Attorney, Agent, or Firm*—Jordan and Hamburg, LLP

(57) ABSTRACT

A system for remote controlling a drive in accordance with data transmitted to the drive includes a data generator, for generating data, including identification information data, for distinguishing the transmitter from among a plurality of transmitters, and drive-specifying information data, for distinguishing the drive from among a plurality of drives; operation control information data, and discrimination information data; a transmitter, for transmitting the data; a receiver, for receiving the transmitted data; a data storage, for storing identification information data assigned to the drive; a first discriminator, for discriminating whether received data is operation control information data or identification information data; a second discriminator, for discriminating whether the received data is the data transmitted to the drive; a controller, for executing operation control in accordance with the operation control information data; and an identification-information changer.

19 Claims, 13 Drawing Sheets

FOREIGN PATENT DOCUMENTS

| | | |
|---|---|---|
| JP | 02-252395 | 10/1990 |
| JP | 05-308678 | 11/1993 |
| JP | 06-012846 | 1/1994 |
| JP | 6-12846 | 1/1994 |
| JP | 10-66165 | 3/1998 |
| JP | 10-066165 | 3/1998 |
| JP | 11-069465 | 3/1999 |
| JP | 2000-051541 | 2/2000 |

* cited by examiner

CASE OF TRANSMISSION OF CONTROL DESIGNATION SIGNAL

CASE OF TRANSMISSION OF IDENTIFICATION-INFORMATION-REWRITE- DESIGNATION SIGNAL

REMOTE CONTROL SYSTEM AND TRANSMITTER AND DRIVE FOR THE SAME

BACKGROUND OF THE INVENTION

1. Field of the Invention

The present invention relates to a system for remote-controlling a drive, such as an automobile, a robot, or the like.

2. Description of the Prior Art

When remote-controlling a plurality of drives at the same place by infrared radiation or radio waves, it may be difficult to accurately control the drives because signals sent from a transmitter to the drives interfere with each other. As a remote control system for solving the above problem, a system is studied in which identification information is set to a transmitter and a drive respectively to separate relations between the transmitter and the drive from each other in accordance with match or mismatch between these pieces of identification information. In the case of the system, the transmitter is provided with device for transmitting the data including identification information for designating a drive to be controlled and control information for controlling the drive and the drive is provided with device for discriminating the control information for the device or not by comparing the identification information included in received data with the identification information set to the drive. Moreover, when the above pieces of identification information match with each other, the controller of the drive discriminates the control information as the control information for the controller and performs the operation control based on the control information.

The above remote control system makes it possible to accurately control a purposed drive for each transmitter even under an environment in which a plurality of transmitters are present by changing identification information for each transmitter. Moreover, by making it possible for one transmitter to use a plurality of pieces of identification information in an alternate way, it is also possible to selectively control a plurality of drives by one transmitter.

However, when separating relations between a transmitter and a drive from each other in accordance with identification information, it is necessary that pieces of identification information for drives to be simultaneously controlled at the same place are different from each other. In this case, if the identification information for a drive is fixed and therefore, the information cannot be changed, a user has to purchase a new drive so that the drive identification information the user already has does not overlap with the fixed identification information but this is troublesome. Moreover, when a plurality of users use transmitters at the same place, there is a disadvantage that a drive to which the identification information same as the identification information already used is set cannot be used.

Moreover, it is necessary that a manufacturer of drives separately manufactures every a plurality of types of drives correspondingly to every identification information usable by transmitters and thereby, production control become complicated. Moreover, for circulation of drives and suppliers, the labor for stock management increases.

In the case of a so-called radio-control toy using radio waves, a mechanism is provided in which a user selects the frequency of a radio wave and individually controls a plurality of units by replacing components referred to as crystal. However, when changing identification information through component replacement, there is a disadvantage that the identification information cannot be changed unless the user has a purposed component.

SUMMARY OF THE INVENTION

Therefore, it is an object of the present invention to provide a remote control system allowing a user to set the identification information for relating a transmitter with a drive but not requiring replacement of special components when setting the identification information.

In order to achieve the above object, according to one aspect of the present invention, there is provided a remote control system for remote-controlling a drive in accordance with data sent from a transmitter, wherein the transmitter is provided with: a data generation device for generating the data including identification information for relating the transmitter with the drive, operation control information for controlling operations of the drive, and discrimination information for discriminating the data for operation control or the data for change of identification information in accordance with an operation of a predetermined input unit performed by a user; and a transmission device for transmitting the data, and wherein the drive is provided with: a reception device for receiving the data transmitted from the transmitter; a storage device for storing identification information assigned to the drive itself; a first discrimination device for discriminating whether received data is the data for operation control or the data for change of identification information in accordance with the discrimination information included in the received data; a second discrimination device for discriminating whether the received data is the data transmitted to the drive itself or not by comparing the identification information included in the received data with the identification information stored in the storage device; a control device for executing operation control in accordance with the operation control information included in the data discriminated as the data for operation control and as the data transmitted to the drive itself; and an identification-information change device for changing the identification information stored in the storage device in accordance with the identification information included in the data discriminated as the data for change of the identification information.

According to the remote control system of the present invention, by including discrimination information in the data transmitted from a transmitter, it is made possible for a drive to discriminate whether the data transmitted from the transmitter to the drive is the data for operation control or the data for change of the identification information, control the operations of the drive in accordance with the control information included in the data when the data is the data for operation control, and change the identification information stored in storage device in accordance with the identification information included in the data when the data is the data for change of the identification information. Moreover, by using identification information and thereby discriminating whether the data is transmitted to the drive itself or not, it is possible to distinguishably control a plurality of drives.

Thus, in the case of the present invention, because a user can set the identification information for relating a transmitter with a drive, it is unnecessary to perform production management or stock management of drives in accordance with the type of identification information and the labors necessary for production, circulation and sale of drives are reduced. Moreover, because a user can set identification information by a transmitter, the user does not need to always prepare special components for change of identification information and thus, the user can easily enjoy remote control. Moreover, in a transmitter, at least some of the circuits for transmitting the data for operation control to a transmitter can also be used for transmission of the data for change of identification information, and in a drive, at least some of the circuits for receiving the data for operation control can also be used for reception of the data for change of identification information. Therefore, it is possible to reduce the numbers of components of a transmitter and a drive and contribute to reduction in costs and sizes of them.

In the case of the remote control system of the present invention, it may be allowed that when a predetermined identification-information-change-designating operation is performed on the input unit, the data generation device of the transmitter generates the data so that change-designating information for designating change of the identification information is added to the discrimination information and the identification information, which is set through the input unit when the change of the identification information is designated, is included in the data, and the first discrimination device discriminates whether or not the received data is the data for change of the identification information based on whether or not the change-designating information is added to the discrimination information.

In this case, the identification information for the drive is changed when the user sets desired identification information, and then performs an identification-information-change-designating operation.

It may also be allowed that the identification information includes transmitter-specifying information for distinguishing a plurality of transmitters from each other and drive-specifying information for distinguishing a plurality of drives from each other, the data generation device of the transmitter can independently change the transmitter-specifying information and the drive-specifying information included in the data in accordance with an operation of the input unit performed by the user, and the second discrimination device of the drive discriminates that the received data is the data transmitted to the drive itself when the transmitter-specifying information and the drive-specifying information included in the received data coincide with the transmitter-specifying information and the drive-specifying information stored in the storage device.

In this case, because the relation between the transmitter and the drive can be changed even if any one of the transmitter-specifying information and the drive-specifying information is changed, it is possible to realize various combinations. For example, when a plurality of drives are controlled by one transmitter, it is made to match the transmitter-specifying information of the transmitter with the transmitter-specifying information of each drive while it is made to change the drive-specifying information every drive. Then, by changing the drive-specifying information in the data to be sent from the transmitter correspondingly to a drive to be controlled, it is possible to independently control the respective drives. Moreover, when a plurality of transmitters are simultaneously used, it is possible to correctly relate a transmitter with a drive and control them by changing transmitter-specifying information for each transmitter even if pieces of drive-specifying information are matched with each other. According to the above mechanism, it is possible to control a plurality of drives separately from each other by each transmitter even under an environment in which a plurality of transmitters are simultaneously operated.

In the case of the remote control system of the present invention, it may be allowed for the identification-information change device to change the identification information when the reception state of the data for change of the identification information meets a predetermined condition. For example, it may be allowed to change the identification information by assuming that the condition is satisfied when receiving the data for change of the identification information a predetermined number of times. Thus, it is possible to eliminate a fear that identification information is unexpectedly changed due to noises and resultantly improve reliability.

It may also be allowed for the storage device of the drive to include a nonvolatile memory. In this case, the identification information is held with no backup of a power source and thus a user can repeatedly change the identification information.

According to the another aspect of the present invention, there is provided a transmitter for remote-controlling a drive, comprising: a data generation device for generating data including identification information for relating the transmitter with the drive, operation control information for controlling operations of the drive, and discrimination information for discriminating the data for operation control or the data for change of the identification information in accordance with an operation of a predetermined input unit performed by a user; and a transmission device for transmitting the data.

Moreover, according to still another aspect of the present invention, there is provided a drive to be controlled in accordance with data sent from a transmitter comprising: a reception device for receiving the data transmitted from the transmitter, the data including identification information for relating the transmitter with the drive, operation control information for controlling operations of the drive, and discrimination information for discriminating the data for operation control or the data for change of the identification information; and a storage device for storing identification information assigned to the drive itself; a first discrimination device for discriminating whether received data is the data for operation control or the data for change of identification information in accordance with the discrimination information included in the received data; a second discrimination device for discriminating whether the received data is the data transmitted to the drive itself or not by comparing the identification information included in the received data with the identification information stored in the storage device; a control device for executing operation control in accordance with the operation control information included in the data discriminated as the data for the operation control and as the data transmitted to the drive itself; and an identification-information change device for changing the identification information stored in the storage device in accordance with the identification information included in the data discriminated as the data for change of the identification information.

By combining the above transmitter and drive, it is possible to realize the remote control system of the present invention.

In the case of a transmitter according to the present invention, it may also be allowed that when a predetermined identification-information-change-designating operation is performed on the input unit, the data generation device generates the data so that change-designating information for designating the change of the identification information is added to the discrimination information and the identification information, which is set through the input unit when the change of the identification information is designated, is included in the data. It may also be allowed that the identification information includes transmitter-specifying information for distinguishing a plurality of transmitters from each other and drive-specifying information for distinguishing a plurality of drives from each other and the data generation device can independently change the transmitter-specifying information and the drive-specifying information included in the data in accordance with an operation of the input unit performed by the user.

Moreover, in the case of a drive according to the present invention, it may be allowed that the first discrimination device discriminates whether or not the received data is the data for change of the identification information based on whether or not predetermined change-designating information is added to the discrimination information. It may be allowed that the identification information includes transmitter-specifying information for distinguishing a plurality of transmitters from each other and drive-specifying information for distinguishing a plurality of drives from each other and the second discrimination device discriminates that the received data is the data transmitted to the drive itself when the transmitter-specifying information and drive-specifying information included in the received data coincide with the transmitter-specifying information and drive-specifying information stored in the storage device, respectively.

When a plurality of transmitters, each of which is the same as the above transmitter, are used at the same time, it may be allowed to set timings when transmitters transmit data to periods different from each other in accordance with the transmitter-specifying information set to the respective transmitters. For example, it is preferable to provide each of the transmitters with a reception device for receiving the data transmitted from another transmitter and a timing setting device for setting self-data transmission timing so that the self-data transmission timing does not overlap with the transmission timing of the data sent from the other transmitters.

According to still further aspect of the present invention, there is provided another remote control system making it possible to separately control a plurality of drives by relating a transmitter with a drive to be remote-controlled by data sent from the transmitter in accordance with identification information included in the data, wherein the transmitter is provided with an identification-information change device for changing the identification information included in the data in response to an identification-information-setting operation performed by a user on a predetermined input unit, and a change-information addition device for adding change-designating information for designating change of the identification information to the data in response to an identification-information-change-designating operation performed by the user on the input unit, and wherein each of the drives is provided with a storage device for storing the identification information and an identification-information change device for changing the identification information stored in the storage device in accordance with identification information included in the data to which the change-designating information is added.

According to this remote control system, it is possible for a user to set identification information for relating a transmitter with a drive by adding predetermined change-designating information to the data sent from the transmitter. Therefore, it is unnecessary to perform production management and stock management of drives in accordance with the type of identification information and the labor required for production, circulation, and sale of drives is reduced. A user does not have to always prepare special components for change of identification information and therefore, the user can easily enjoy remote control. Moreover, in a transmitter, at least some of the circuits for transmitting the data for operation control can also be used for transmission of identification-information-change data, and in a drive, at least some of the circuits for receiving operation control data can also be used for receiving identification-information change data. Therefore, it is possible to reduce the numbers of components of a transmitter and thus a drive and contribute to reduction in costs and sizes of them.

Still another aspect of the present invention, there is provided another transmitter used for a remote control system, the system making it possible to separately control a plurality of drives by relating the transmitter with the drive to be remote-controlled by data sent from the transmitter in accordance with identification information included in the data, the transmitter comprising: an identification-information change device for changing identification information included in the data in response to an identification-information-setting operation performed by a user on a predetermined input unit; and a change-information addition device for adding change-designating information for designating change of the identification information to the data in response to an identification-information-change-designating operation performed by the user on the input unit.

Still another aspect of the present invention, there is provided another drive used for a remote control system, the system making it possible to separately control a plurality of drives by relating a transmitter with a drive to be remote-controlled by data sent from the transmitter, the drive comprising: a storage device for storing the identification information; and an identification-information change device for changing the identification information stored in the storage device in accordance with the identification information included in the received data including predetermined change-designating information.

By combining the transmitter with the drives, it is possible to constitute the above-describe another remote-control system.

DESCRIPTION OF THE PREFERRED EMBODIMENT

Figure 1:
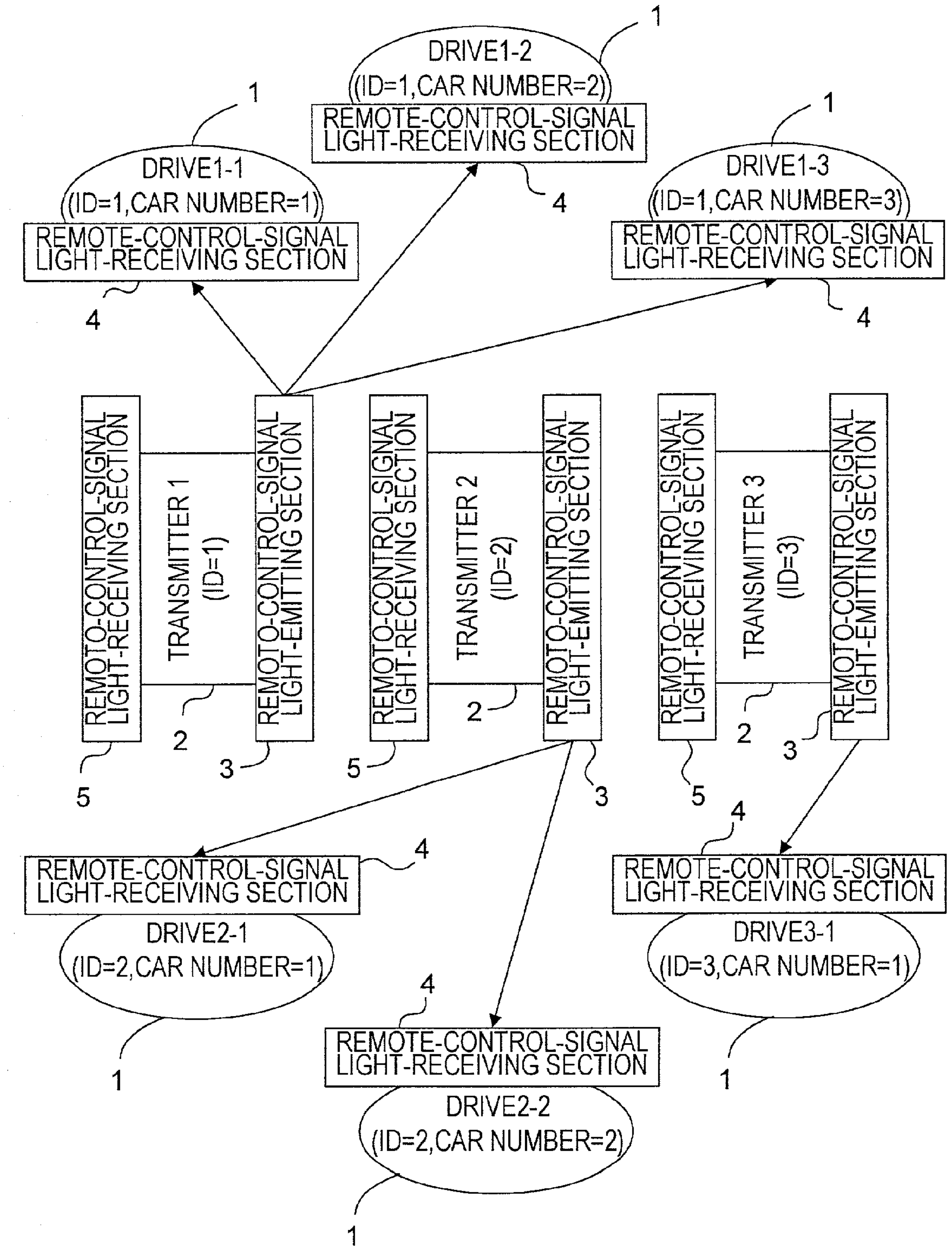
FIG. 1 is an illustration showing a schematic configuration of a remote-control system of the present invention.

FIG. 1 is an illustration showing a schematic configuration of a remote control system of the present invention. In FIG. 1, a case is assumed in which six drives 1 . . . 1 are separately remote-controlled by three transmitters 2 . . . 2 at the same place.

Any one of the ID codes 1 to 4 is set to the drives 1 . . . 1 and transmitters 2 . . . 2 as transmitter-specifying information and any one of the car numbers 1 to 8 is set to the drives 1 . . . 1 and transmitters 2 . . . 2 as drive-specifying information. In the case of this embodiment, a combination between an ID code and a car number functions as the identification information for relating the transmitter 2 with the drive 1. Infrared radiation is used for remote control of each drive 1. Therefore, a remote-control-signal light-emitting section 3 is mounted on each transmitter 2 and a remote-control-signal light-receiving section 4 is mounted on each drive 1. Moreover, a remote-control-signal light-receiving section 5 is mounted on each transmitter 2 in order to synchronize data transmission from each transmitter 2.

Figure 2:
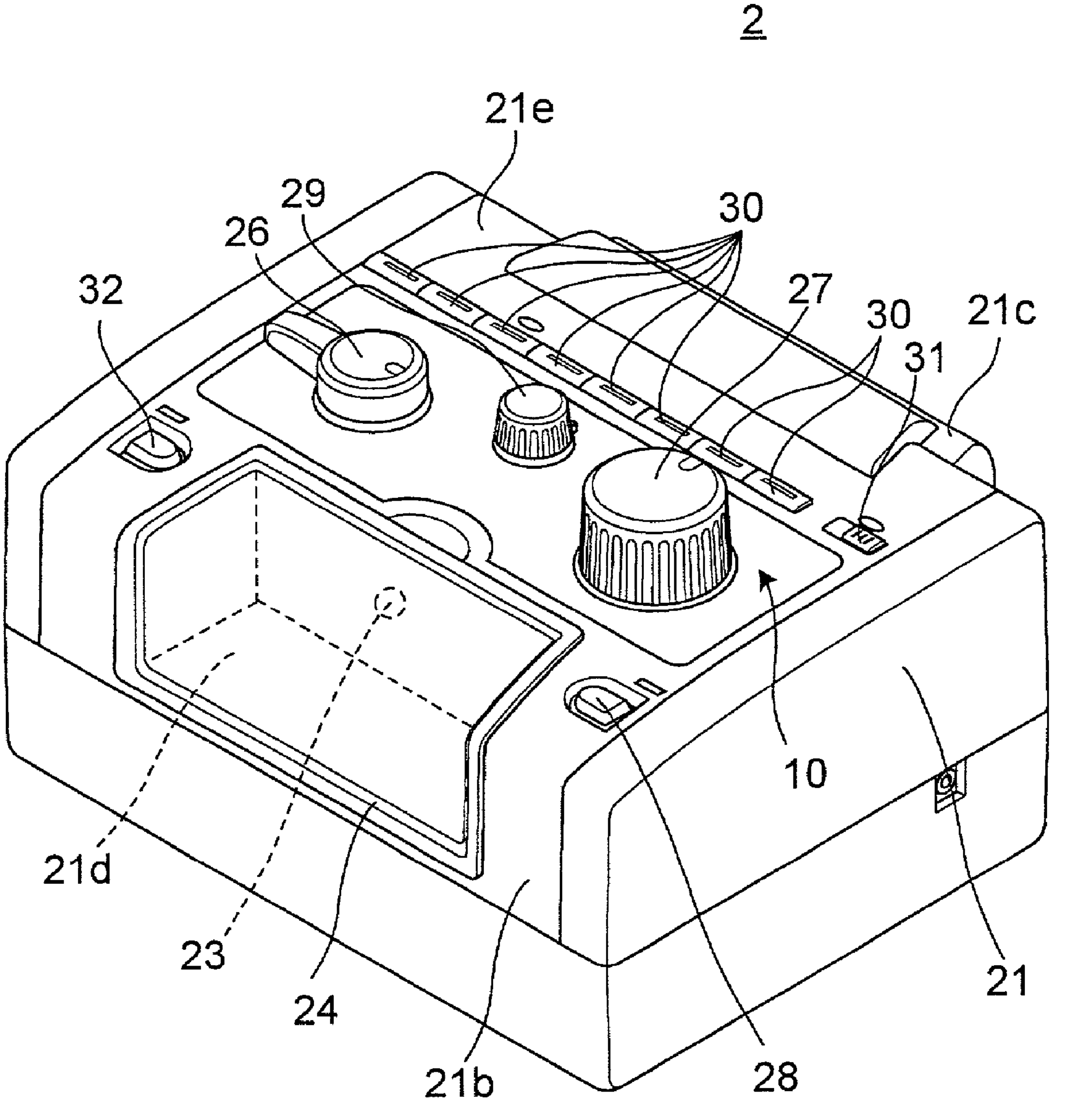
FIG. 2 is a perspective view of the front-side appearance of a transmitter.
Figure 3:
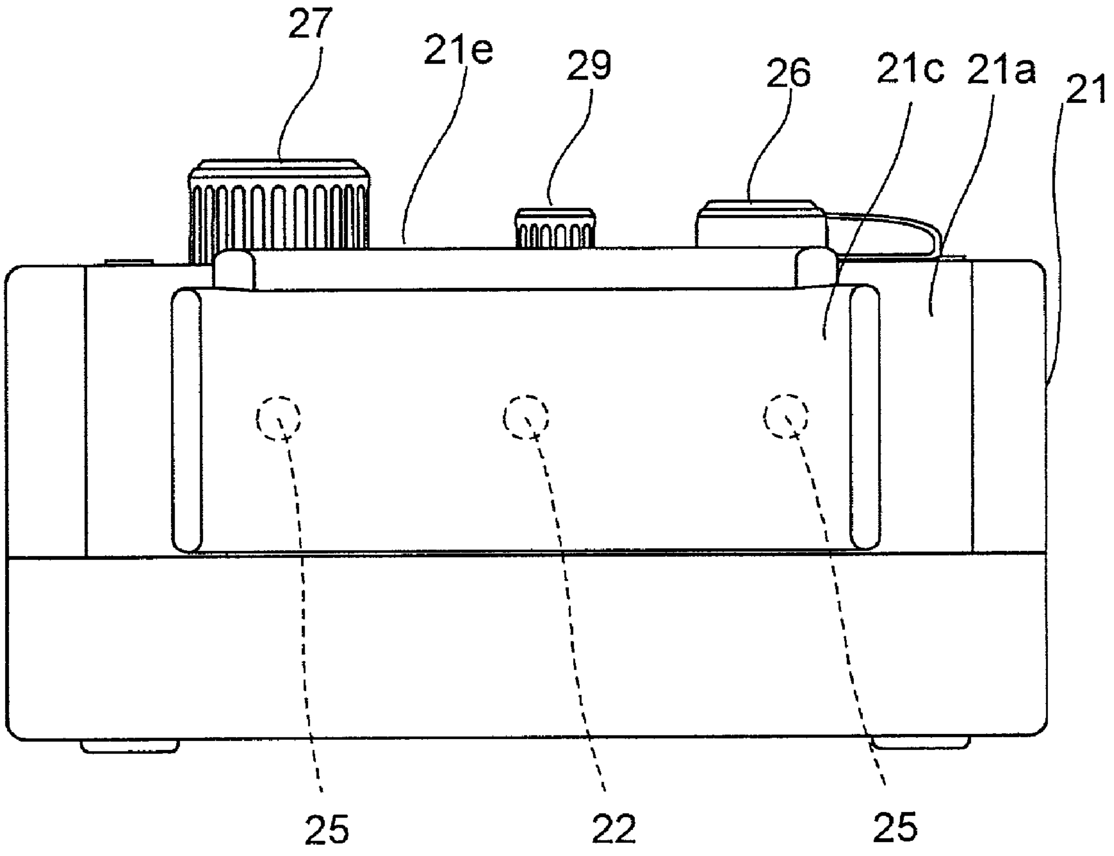
FIG. 3 is a back view of a transmitter.

FIGS. 2 and 3 show details of the transmitter 2, in which FIG. 2 is a perspective view of the transmitter 2 viewed from the front side (user side) and FIG. 3 is a back view of the transmitter 2. As shown in these illustrations, the transmitter 2 has a casing 21 formed of a resin and the like. A light-emitting section 22 (corresponding to a remote-control-signal light-emitting section 3 in FIG. 1) for transmitting data to the drive 1 is set on the back 21*a* of the casing 21 and a light-emitting section 23 for transmitting the data for rewriting the identification information for the drive 1 is set at the front 21*b* of the casing 21. A cover 21*c* allowing infrared radiation to pass therethrough is set to the back 21*a* and the light-emitting section 23 is set to the inside of the cover 21*c*. Moreover, light-receiving sections 25 and 25 serving as the remote-control-signal light-receiving section 5 in FIG. 1 are set to the inside of the cover 21*c*.

Figure 4:
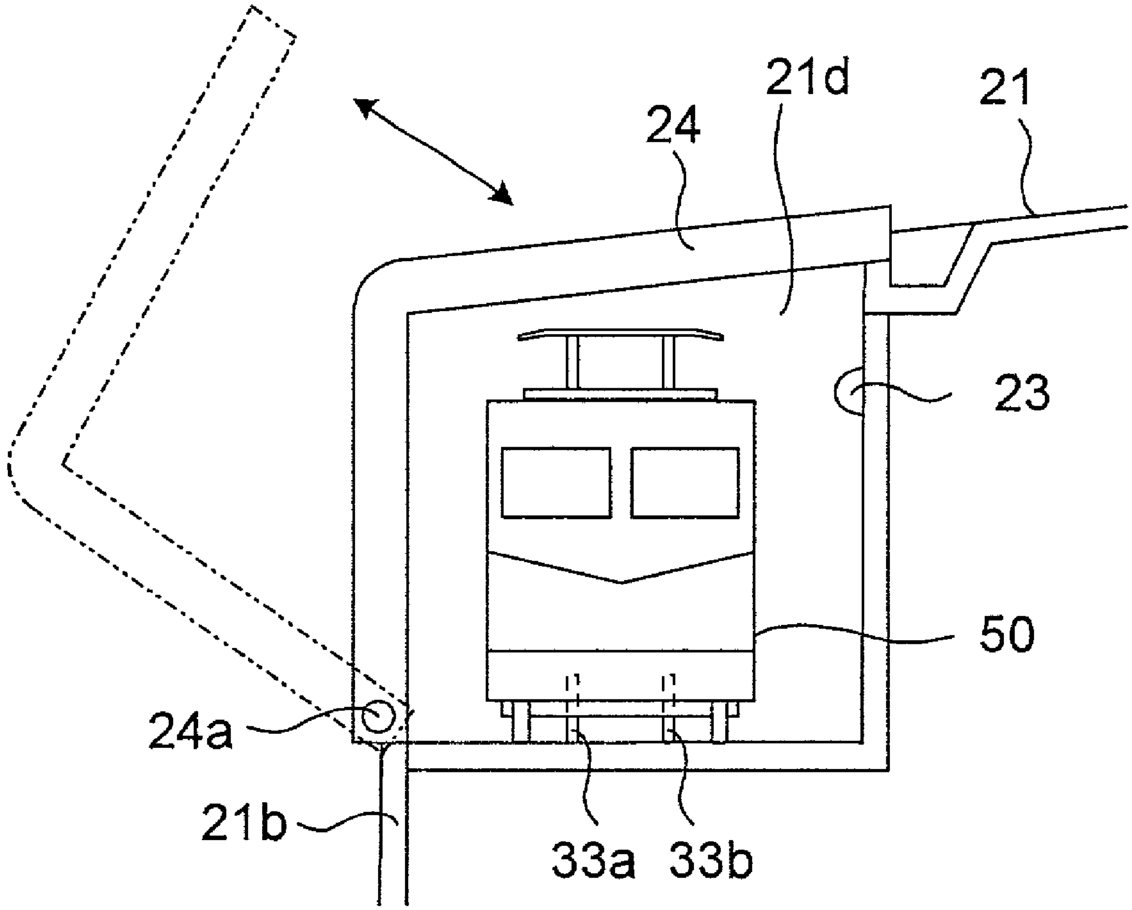
FIG. 4 is a sectional view of a concave portion formed at the front side of a transmitter.

As shown also in FIG. 4, a concave portion 21*d* is formed at the front 21*b* of the casing 21 and covered by a lid 24. The lid 24 can be opened to the front side about a hinge 24*a* at the bottom end of the lid 24. The light-emitting section 23 is set to the face of the wall of the concave portion 21*d*. Charge terminals 33*a* and 33*b* are set on the bottom face of the concave portion 21*d*. These terminals 33*a* and 33*b* contact with a charge terminal of an electric-train model 50 (refer to FIG. 7) serving as the drive 1 housed in the concave portion 21*d* to charge a battery built in the electric-train model 50.

According to the above transmitter 2, it is possible to prevent the infrared radiation emitted from the light-emitting section 23 from leaking to the outside of the concave portion 21*d* by housing the drive 1 in the concave portion 21*d* and closing the lid 24. Therefore, it is possible to eliminate a fear that identification information for the drive 1 outside of the concave portion 21*d* is carelessly rewritten.

As shown in FIG. 2, an F/R switch 26 to be operated to switch forward and reverse rotations of the drive 1, a speed control dial 27 to be operated to set a speed, a rewrite control switch 28 to be operated to designate rewriting of identification information for the drive 1, an ID-code-setting switch 29 for setting an ID code of the transmitter 2, car-number selection switches 30 . . . 30 for designating car-number, a power-source switch 31, and a charge switch 32 are set to the upper face 21*e* of the casing 21 as an input unit 10.

The F/R switch 26 can be switched to forward-rotation position or reverse-rotation position and it outputs signals corresponding to these positions. The speed control dial 27 outputs a speed designation signal proportional to a rotation control amount from the initial position corresponding to the speed 0. The rewrite control switch 28 is a push-button switch that outputs an on-signal when it is pushed. The ID-code setting switch 29 can be switched at four positions corresponding to ID codes 1 to 4 and it outputs signals corresponding to these positions. By switching the ID-code setting switch 29, it is possible to select an ID of the transmitter 2 among IDs 1 to 4. The car-number selection switch 30 is a push-button switch that outputs an on-signal corresponding to a push control. Eight car-number selection switches 30 are provided correspondingly to car numbers 1 to 8 by one to one. By pushing any one of the car-number selection switches 30, it is possible to select a car number corresponding to the selected car-number selection switch 30.

Figure 5:
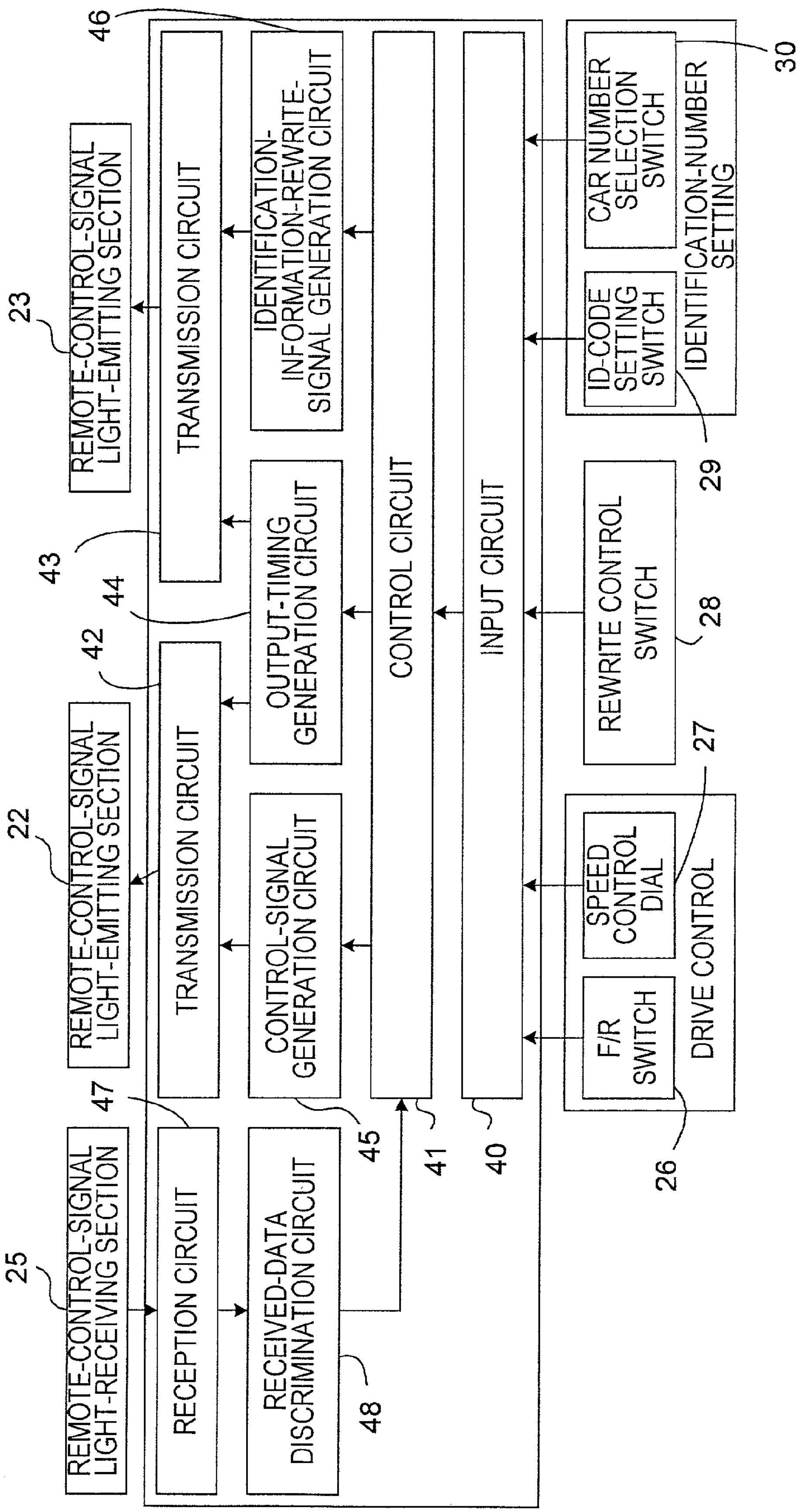
FIG. 5 is a functional block diagram of a transmitter.

FIG. 5 shows a circuit configuration of the transmitter 2. Signals corresponding to operations of input units 26 to 30 are input to a control circuit 41 through an input circuit 40. The remote-control-signal light-emitting sections 22 and 23 are respectively constituted by including light-emitting device such as an LED and emit infrared radiation corresponding to a designation by a transmission circuit 42 or 43. The transmission circuits 42 and 43 output transmission data to the remote-control-signal light-emitting section 22 or 23 in accordance with the timing designated by an output-timing generation circuit 44. The output-timing generation circuit 44 counts time in accordance with a timer set value supplied from the control circuit 41. When the time corresponding to the timer set value elapses, the circuit 44 outputs a transmission designation to the transmission circuit 42 or 43. Frequencies of infrared-radiation carrier signals output from the remote-control-signal light-emitting sections 22 and 23 are the same in all transmitters 2.

Data to be output to the remote-control-signal light-emitting section 22 on the back 21*a* of the transmitter 2 is generated by the control-signal generation circuit 45. The transmission circuit 42 modulates the data generated by the control-signal generation circuit 45 in accordance with a remote-control-signal carrier signal to drive the remote-control-signal light-emitting section 22.

Figure 6A:
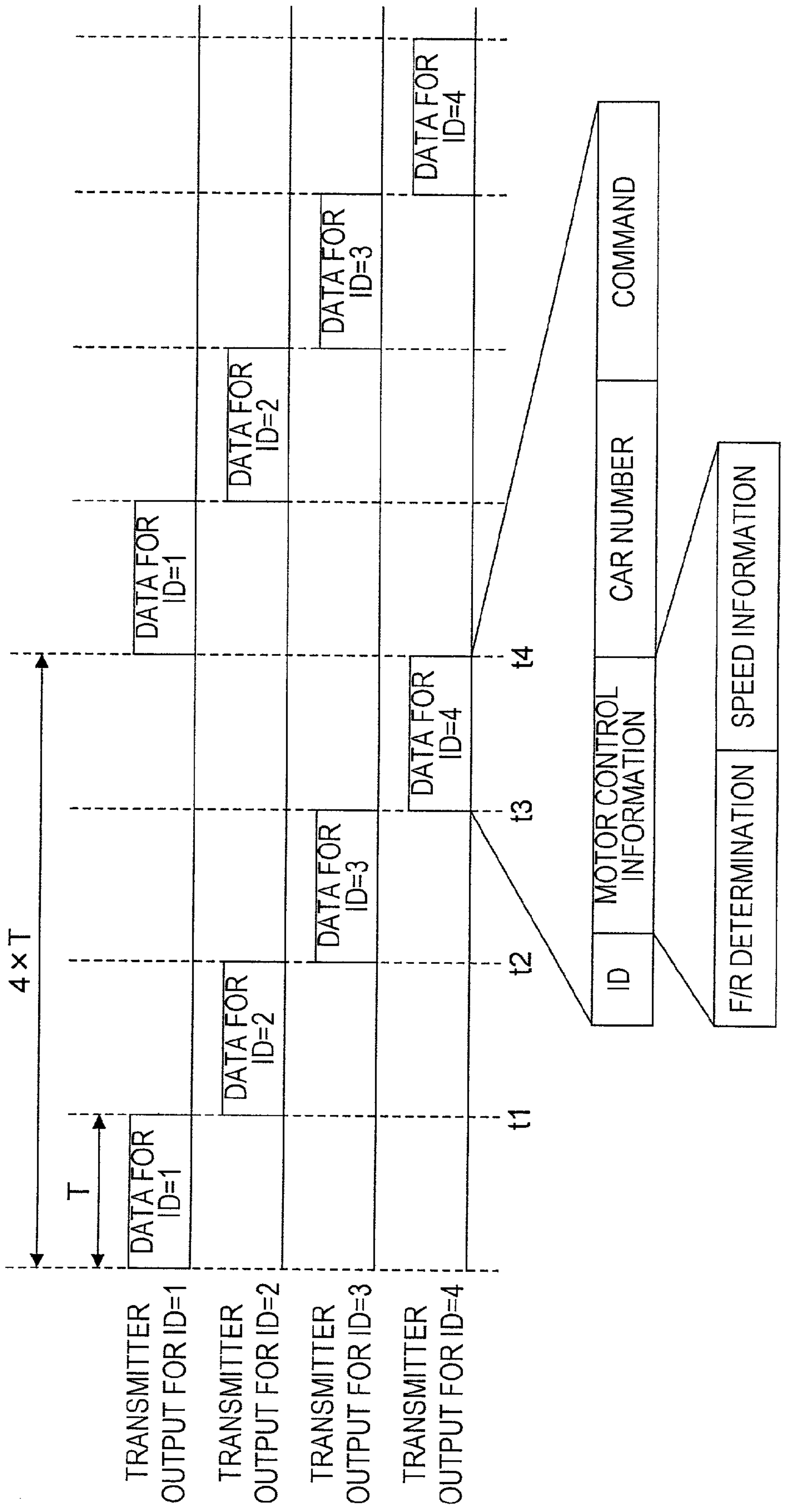
FIGS. 6A and 6B are illustrations showing states of transmitting data from transmitters.

In this case, one-block remote-control data generated by the control-signal generation circuit 45 is constituted by an ID code, motor control information, a car number, and a command for realizing an additional function as shown in FIG. 6A. Moreover, the motor control information is constituted by information for designating whether forward direction or reverse direction (F/R determination) of the rotational direction of a motor and information for designating a motor-driving speed. Two-bit-data corresponding to an ID code selected by the ID-code setting switch 29 is set to the ID-code part, one-bit data showing whether the F/R switch 26 is set to forward-rotation position or reverse-rotation position is set to the F/R-discriminating part of a motor, and five-bit data for designating a speed corresponding to a rotation control amount of the speed control dial 27 is set to the motor control information part. Three-bit data for designating any one of car numbers 1 to 8 selected by the car-number selection switch 30 is set to the car-number part. The command part is constituted by a predetermined number of bits and a code for designating an additional function is set to the command part according to necessity. The number of bits of the one-block remote-control data is always constant. Therefore, the time required to transmit the one-block remote-control data is also constant.

The remote-control-signal light-receiving section 25 shown in FIG. 5 receives the infrared radiation sent from another transmitter 2 and outputs a signal obtained by removing carrier components from the received infrared radiation to a reception circuit 47. The reception circuit 47 decodes a signal supplied from the remote-control-signal light-receiving section 25 into one-block remote-control data and outputs the data to a received-data discrimination circuit 48.

The received-data discrimination circuit 48 discriminates the ID code of the received data supplied from the reception circuit 47 and supplies the determination result to the control circuit 41. The control circuit 41 controls the output timing of the data supplied from the transmission circuit 42 in accordance with signals supplied from the received-data discrimination circuit 48 and input circuit 40. Thus, the data transmitted from another transmitter 2 is received to set the output timing of the data in order to prevent interference due to simultaneous transmission of remote-control data from a plurality of transmitters 2. This point is described below in detail.

FIG. 6A shows how to take the transmission timing when four transmitters 2 are simultaneously operated. As shown in FIG. 6A, infrared-radiation emission timings from the remote-control-signal light-emitting section 22 are set to periods different from each other in accordance with ID codes set to the transmitter 2 and the drive 1 to be controlled by the transmitter 2 in common.

The time length for one transmitter 2 to transmit a remote-control signal is equal to T and each transmitter 2 repeats transmission of a remote-control signal at a cycle corresponding to the number of transmitters 2×transmission time length (=4T). Moreover, the transmission timing of each transmitter 2 is shifted every T from ID code=1 in order. Because each transmitter 2 controls transmission timing in accordance with the above relation, it is possible to prevent transmission periods of four transmitters 2 from overlapping with each other. To realize the above transmission control, it is allowed for the transmitter 2 of ID code=2 in FIG. 6A to control transmission timing as described below.

First, when receiving the data of ID code=1 at the time t1, the transmitter 2 starts outputting the transmission data of its own and completes outputting the transmission data of its own at the time t2. When completing the transmission, the transmitter 2 checks the data received by the reception circuit 47 (refer to FIG. 5) to confirm that interference between signals does not occur. Thereafter, the transmitter 2 sets a transmission timer for counting the next output timing 3T later to start timer counting.

When receiving the remote-control data of ID code=3 at the time t3, the transmitter 2 resets the transmission timer 2T later to start timer counting. When receiving the remote-control data of ID code=4 at the time t4, the transmitter 2 resets the transmission timer 1T later to start timer counting.

Then, when the power source of the transmitter 2 of ID code=1 is turned off or data cannot received from the transmitter 2 of ID code=1 due to noises, it is allowed to start outputting the data of its own when counting by the transmission timer advances by the time T after receiving the data of ID code=4. Moreover, even if signals from another transmitter 2 cannot be received, it is possible to continue outputting transmission data at the cycle 4T by using the time 3T set to the transmission timer when transmission of the data of its own is completed.

Though a case of using four transmitters 2 is described above, it is possible to control transmission timing even in the case of five transmitters or more by adding an ID code. The cycle of transmission timing of each transmitter 2 is equal to N×T (N denotes the number of transmitters). Moreover, it is allowed to set the entire cycle to a value larger than NT by setting a blank period in which no transmitter transmits data between periods in which transmitters 2 transmit data.

Figure 6B:
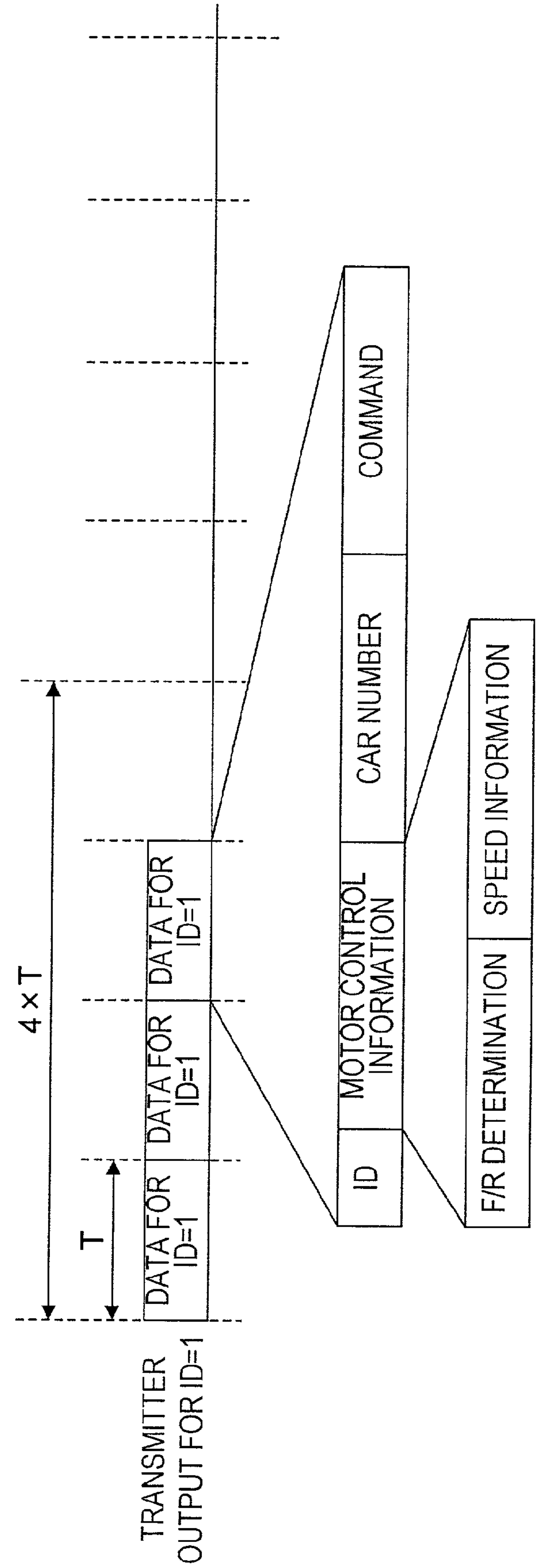

The transmission timing of the data sent from the light-emitting section 23 in FIG. 5 is consecutively set as shown in FIG. 6B (three consecutive times in the case of this example). The data to be output to the remote-control-signal light-emitting section 23 at the front 21*b* of the transmitter 2 is generated by an identification-information-rewrite-signal generation circuit 46 and the transmission circuit 43 drives the remote-control-signal light-emitting section 23 by modulating the data generated by the identification-information-rewrite-signal generation circuit 46 in accordance with a remote-control-signal carrier signal. The data generated by the identification-information-rewrite-signal generation circuit 46 has the same structure as that generated by the control-signal generation circuit 45 as shown in FIG. 6B. However, a specific code for designating rewriting of the ID code and car number of the drive 1 (hereafter referred to as rewrite designation code) is set to the command part of the above data as change-designating information. That is, in the case of this embodiment, data is transmitted from the remote-control-signal light-emitting section 23 through the control circuit 41, identification-information-rewrite-signal generation circuit 46, and transmission circuit 47 only when designating change of ID codes and car numbers from the transmitter 2 to the drive 1.

The control circuit 41 discriminates whether to transmit the data for operation control of the drive 1 or the data for change of identification information depending on the fact that the rewrite control switch 28 is turned on or not and supplies signals corresponding to operation states of the input units 26 to 30 to the control-signal generation circuit 45 when transmitting the data for operation control of the drive 1 and to the identification-information-rewrite-signal generation circuit 46 when transmitting the data for designating change of identification information. When the control-signal generation circuit 45 receives a signal, remote-control data for control of the drive 1 is generated correspondingly to operation states of the input units 26 to 30. When the identification-information-rewrite-signal generation circuit 46 receives a signal, remote-control data for change of the identification information for the drive 1 is generated correspondingly to operation states of the input units 28 to 30.

It is also allowed to communize the generation circuits 45 and 46 and alternatively transmit data from either of the remote-control-signal light-emitting sections 22 and 23 depending on the fact that the rewrite control switch 28 is turned on or not. In this case, for an ID code, motor control information, and a car number in one-block remote-control data, it is allowed to always set the data corresponding to operation states of the ID-code setting switch 29, F/R switch 26, speed control dial 27, and car-number selection switch 30 independently of the fact that the rewrite control switch 28 is turned on or not, set a rewrite designation code to the command part to transmit data from the remote-control-signal light-emitting section 23 only when the rewrite control switch 28 is turned on, and transmit data from the remote-control-signal light-emitting section 22 when controlling operations of the drive 1. Moreover, it is allowed to communize the remote-control-signal light-emitting sections 22 and 23 and transmit the data for operation control of the drive 1 and identification-information-rewriting data from the same light-emitting section.

The control circuit 41 is preferably constituted by combining a microcomputer with a predetermined program. It is allowed to constitute the transmission circuits 42 and 43, output-timing generation circuit 44, control-signal generation circuit 45, identification-information-rewrite-signal generation circuit 46, reception circuit 47, and received-data discrimination circuit 48 as logic circuits or constitute them by combining a microcomputer with a predetermined program similarly to the case of the control circuit 41. Moreover, it is allowed to unite at least one of the output-timing generation circuit 44, control-signal generation circuit 45, identification-information-rewrite-signal generation circuit 46, and received-data discrimination circuit 48 into the control circuit 41.

Figure 7:
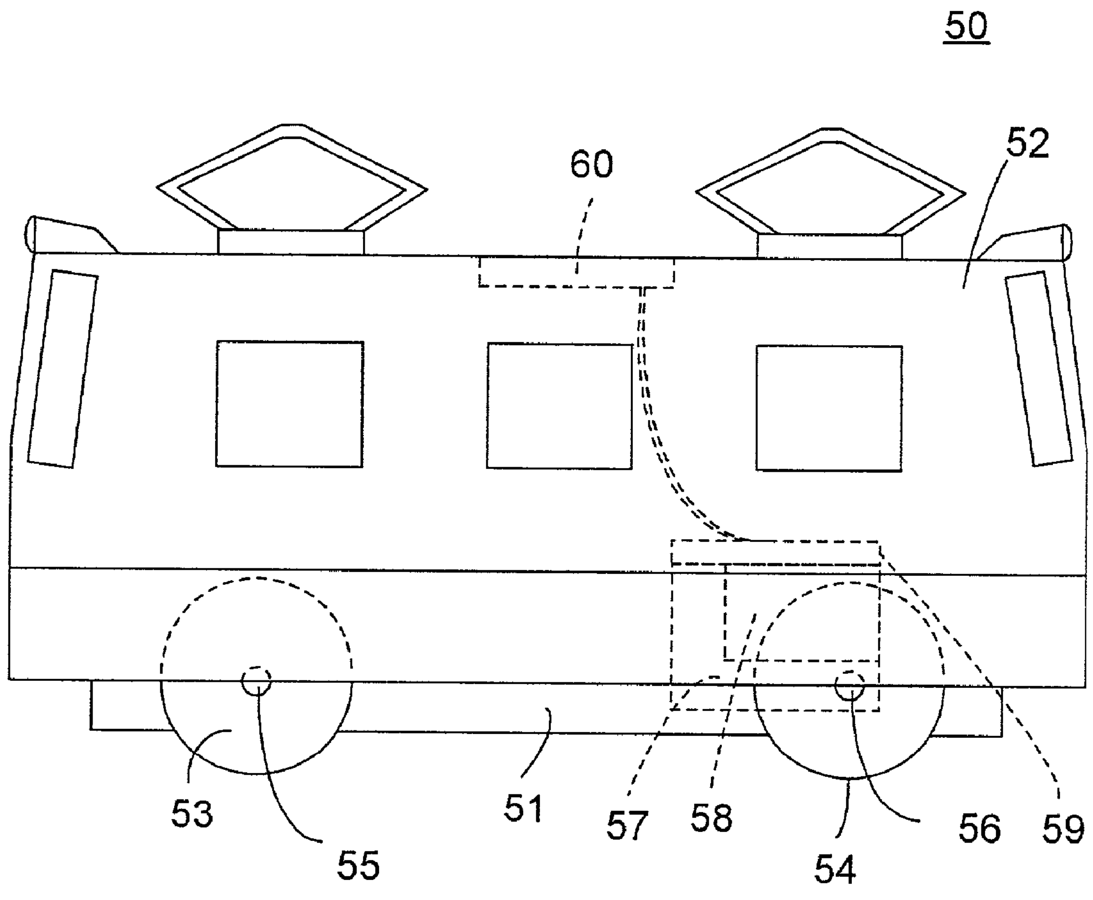
FIG. 7 is an illustration showing an electric-train model as an example of a drive.

FIG. 7 is a side view showing an embodiment of the drive 1. In the case of this embodiment, the drive 1 is constituted as the small electric-train model 50. The electric-train model 50 has a chassis 51 and a body 52 put on the chassis 51. Front wheels 53 are provided for the front of the chassis 51 and rear wheels 54 are provided for the rear of the chassis 51. The front wheel 53 is rotatably set to the chassis 51 through a wheel shaft 55. The rear wheel 54 is set to a transmission gear 57 through the wheel 56. The transmission gear 57 transmits the rotation of a motor 58 serving as a driving source to a wheel shaft 56. A controller 59 constituted as a one-chip microcomputer is set above the transmission gear 57 and motor 58. The controller 59 controls operations of the motor 58 in accordance with the data sent from a remote-control-signal light-receiving section 60 set to the body 52.

Figure 8:
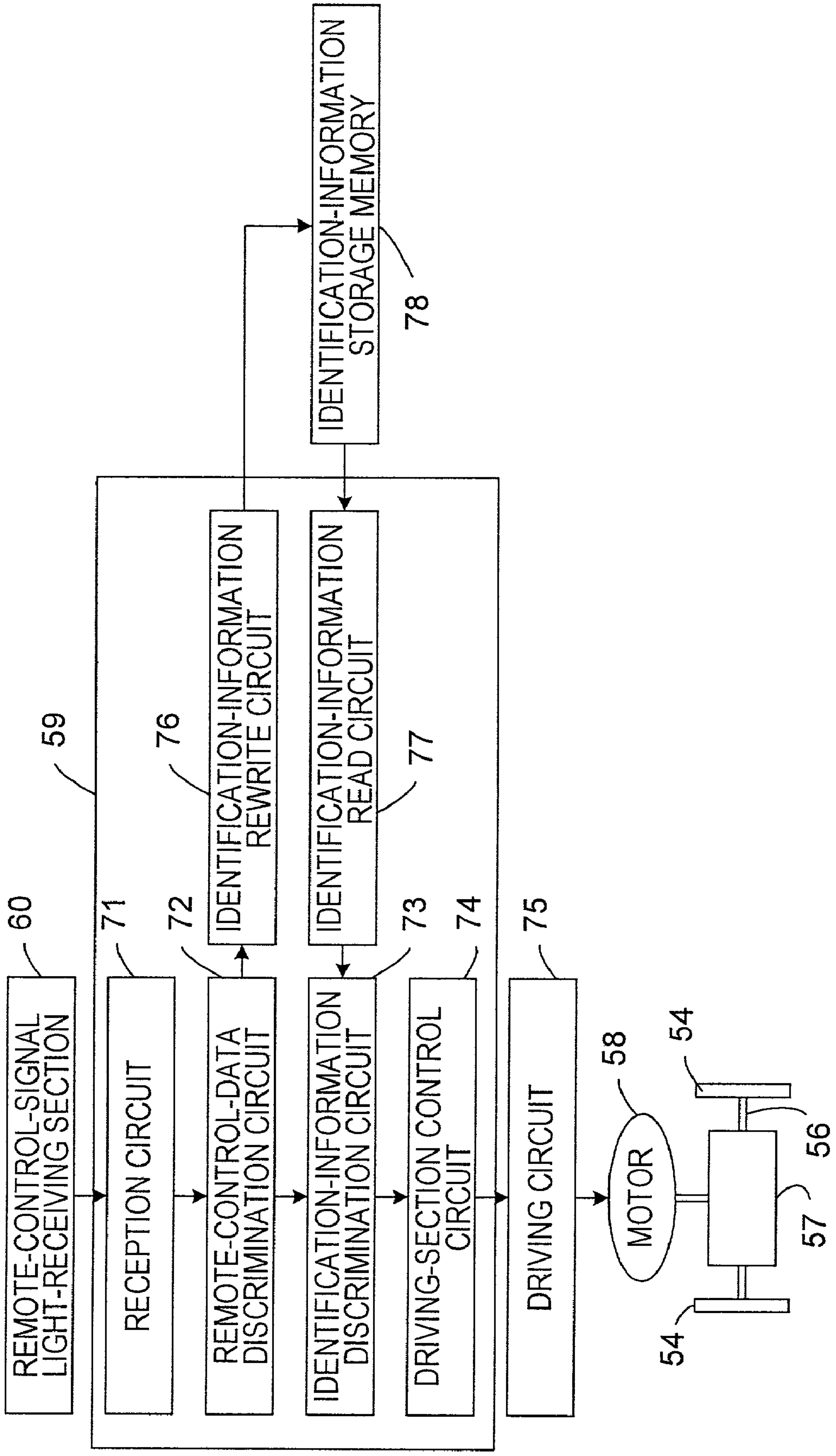
FIG. 8 is a functional block diagram of an electric-train model.

FIG. 8 shows a circuit configuration of a control system mounted on the electric-train model 50. The above remote-control-signal light-receiving section 60 is set to the car model 50. The remote-control-signal light-receiving section 60 receives the infrared radiation emitted from the transmitter 2 and outputs a signal obtained by removing carrier components from the received infrared radiation to a reception circuit 71. The reception circuit 71 decodes the signal supplied from the remote-control-signal light-receiving section 60 into one-block remote-control data and outputs the data to a remote-control-data discrimination circuit 72. The one-block remote-control data is shown in FIGS. 6A and 6B. The remote-control-data discrimination circuit 72 discriminates which is received, the data for controlling operations of the drive 1 or the data for designating rewriting (changing) of the identification information for the drive 1, in accordance with command part of the received data supplied from the reception circuit 71.

When the remote-control-data discrimination circuit 72 discriminates that the received data is the data for controlling operations of the drive 1, an identification-information read circuit 77 reads the identification information assigned to the drive 1 itself from an identification-information storage memory 78 and an identification-information discrimination circuit 73 compares the identification information included in received data with the identification information for the drive 1 itself. When these pieces of identification information coincide with each other, the received data is sent to a driving-section control circuit 74. Then, the driving-section control circuit 74 supplies a motor-driving signal to a driving circuit 75 in accordance with the motor control information included in the received data. The driving circuit 75 drives the motor 58 in accordance with the supplied motor-driving signal.

When the remote-control-data discrimination circuit 72 discriminates that received data is the data for designating rewriting of identification information, the identification information (comprising an ID code and a car number) included in the data is written in the identification-information storage memory 78 by the identification-information rewrite circuit 76. Thereby, the identification information written in the identification-information storage memory 78 is changed.

It is preferable that identification information is stored in the identification-information storage memory 78 without backup by a power source by using a nonvolatile memory such as an EEPROM. It is allowed to constitute the reception circuit 71, remote-control-data discrimination circuit 72, identification-information discrimination circuit 73, driving-section control circuit 74, driving circuit 75, identification-information rewrite circuit 76, and identification-information read circuit 77 as logic circuits or by combining a microcomputer with a predetermined program. Moreover, it is allowed to set an identification-information discrimination circuit, an identification-information read circuit, and an identification-information storage memory different from the identification-information discrimination circuit 73, identification-information read circuit 77, and identification-information storage memory 78 between the reception circuit 71 and remote-control-data discrimination circuit 72 and select received data before sending data to the remote-control-data discrimination circuit 72.

Figure 9:
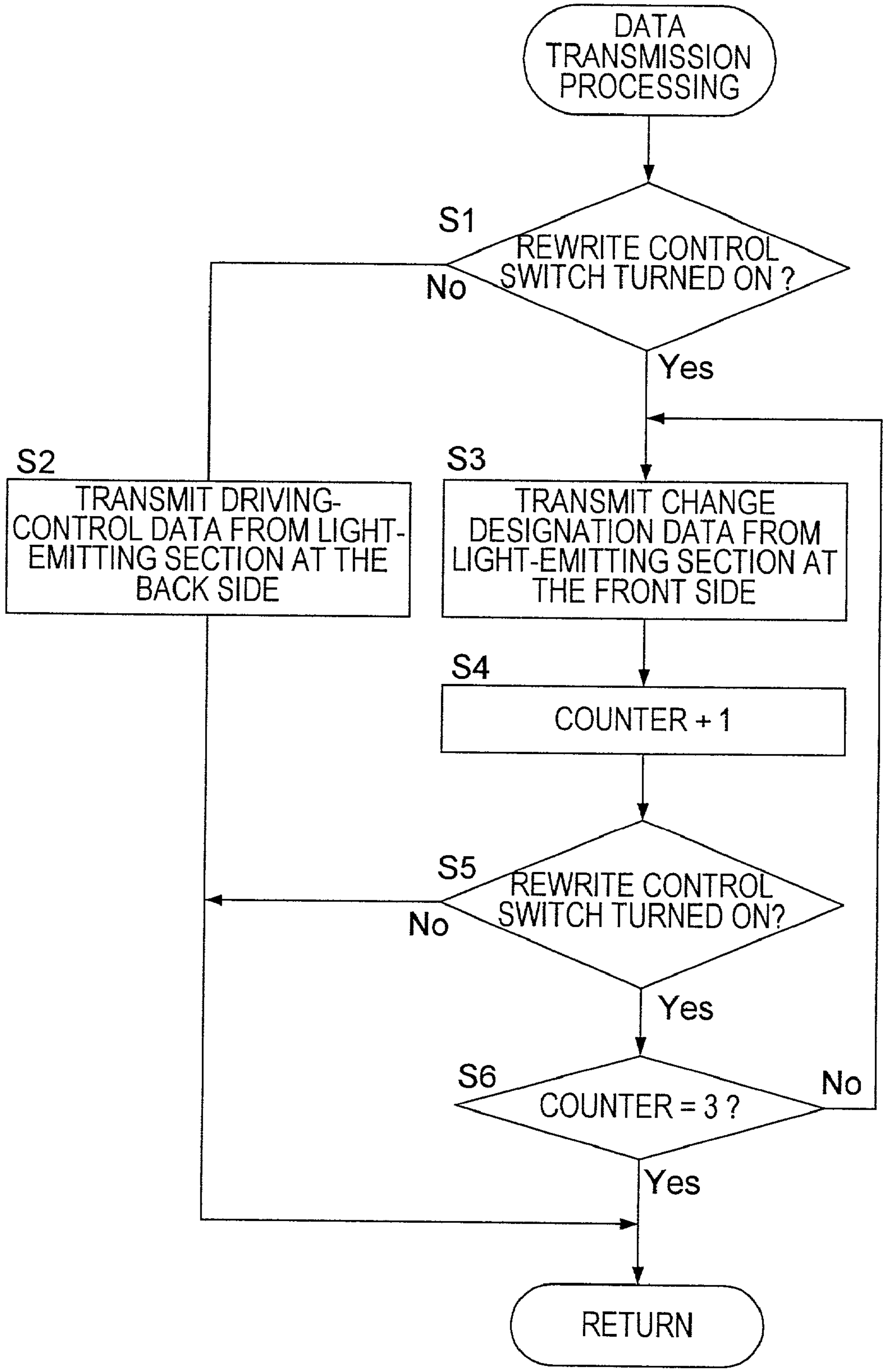
FIG. 9 is a flowchart showing the processing for a transmitter to transmit data.

FIG. 9 is a flowchart showing operations of the transmitter 2 when transmitting data. Under the normal state, the transmitter 2 repeats data transmission at the timing shown in FIG. 6A and the processing in FIG. 9 is performed when the next transmission timing comes. In the case of this processing, the transmitter 2 first decides whether the rewrite control switch 28 is turned on or not (whether the switch 28 is pushed or not) (step S1). When the transmitter 2 decides that the switch 28 is not turned on, it generates the data for controlling operations of the motor 58 in accordance with the operation state of the F/R switch 26 or the like and transmits the data from the light-emitting section 22 (step S2). When the transmitter 2 decides that the rewrite control switch 28 is turned on, it generates the data for designating rewriting to the identification information set by the ID-code setting switch 29 and car-number selection switch 30 and transmits the data from the light-emitting section 23 at the front side (step S3). Then, the transmitter 2 adds 1 to a counter serving as a variable for measuring the number of consecutive transmission times of rewrite designation data (step S4) and then, decides whether the rewrite control switch 28 is continuously turned on or not (step S5). When the switch 28 is turned on, the transmitter 2 decides whether the counted value of the counter reaches 3 (step S6). When the value is less than 3, the transmitter 2 returns to step S3 to retransmit the identification-information rewrite designation data. When the transmitter 2 decides in step S5 that the rewrite control switch 28 is turned off or decides in step S6 that the counted value reaches 3, it completes the processing in FIG. 9.

According to the above processing, when a user continuously pushes the rewrite control switch 28, the data for designating rewriting of identification information is transmitted from the light-emitting section 23 by three consecutive frames as shown in FIG. 6B. However, in the case other than the above, the data for drive controlling the motor 58 is transmitted from the light-emitting section 22.

Figure 10:
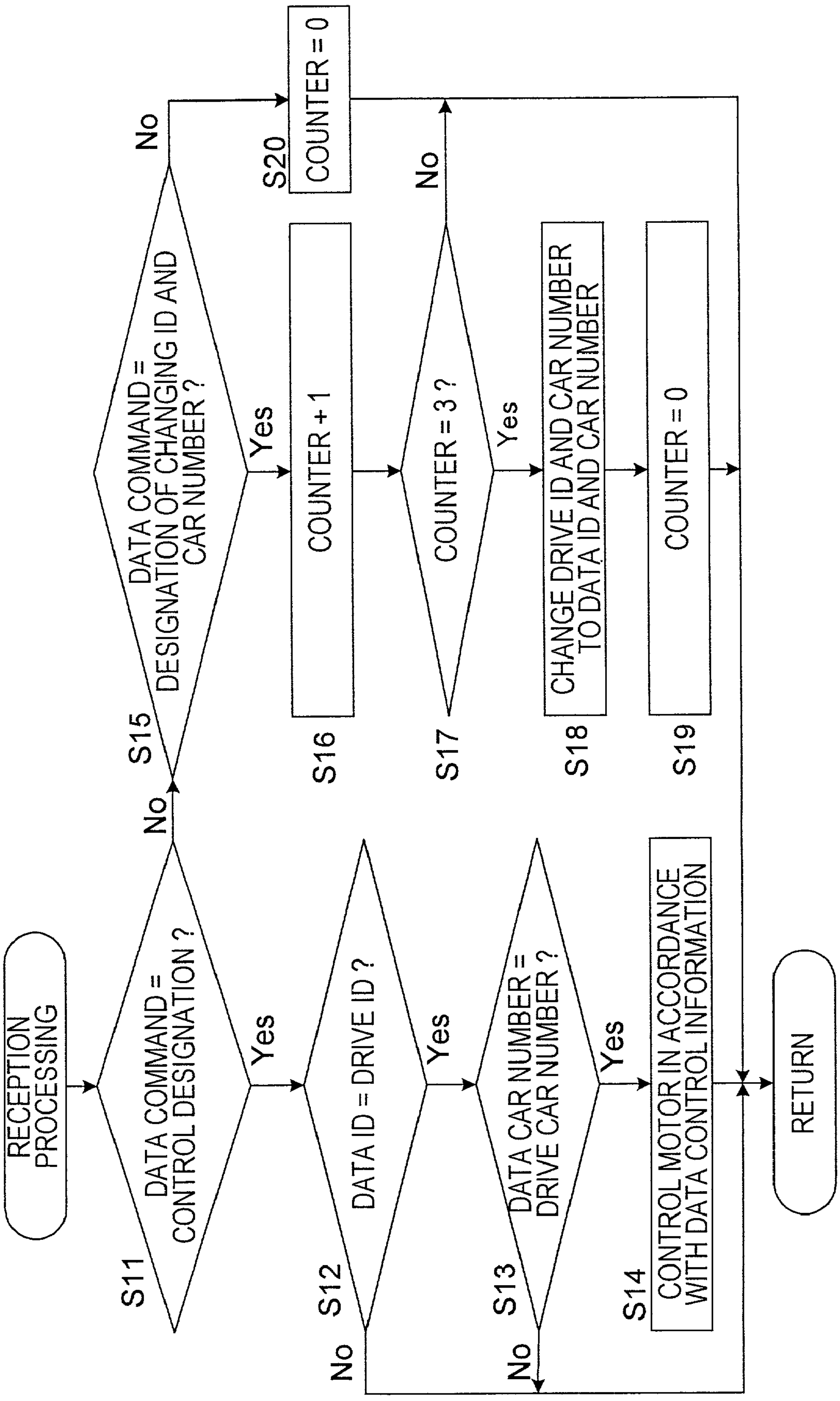
FIG. 10 is a flowchart showing the processing for a drive to receive data.

FIG. 10 is a flowchart showing the reception processing to be executed by the controller 59 of the electric-train model 50 serving as a drive when the controller 59 receives data from the transmitter 2. The controller 59 analyzes a command part included in received data to discriminate whether the received data is the data for controlling operations of the motor 58 or not (step S11). For example, the controller 59 decides the received data as the data for controlling operations of the motor 58 when a specific code for realizing a specific function is not set to the command part. Moreover, when generating the data for controlling operations of the motor 58 by the transmitter 2, it is allowed to include a specific code for designating the data for operation control in the command part and determine the data for operation control of the motor 58 or not depending on presence or absence of the specific code.

When the controller 59 decides that the received data is the data for controlling operations of the motor 58, it discriminates whether the ID code included in the data is the same as the ID code of its own recorded in the identification-information storage memory 78 (step S12). When the ID code included in the data is different from the ID code of its own, the controller 59 ignores the data and temporarily ends the processing in FIG. 10. In this case, the controller 59 waits for the next data to be received.

When the ID code included in the data is the same as the ID code of the self, the controller 59 decides whether the car number included in the data is the same as the car number of its own stored in the identification-information storage memory 78 (step S13). When the car number included in the data is different from the car number of the train model 50 itself, the controller 59 ignores the data and waits for the next data to be received. When the car number included in the data is the same as the car number of the train model 50 itself, the controller 59 controls the motor 58 in accordance with the control information included in the data (step S14) and then, waits for the next data to be received.

When the controller 59 decides that the received data is not the data for controlling operations of the motor 58 in step S11, it decides whether a rewrite designation code is included in the command part or not (step S15). When the rewrite designation cord is not included, the controller 59 resets a counter for discriminating a consecutive number of reception times of rewrite designation codes to 0 (step S20) and waits for the next data to be received. When the rewrite designation code is included, the controller 59 adds 1 to the counter (step S16) and decides whether a counted value reaches 3 or not, that is, whether the remote-control data including the rewrite designation code is received three times or not (step S17). When the counted value does not reach 3, waits for the next remote-control data to be received, when the counted value does reach 3, the controller 59 rewrites the ID code and car number recorded in the identification-information storage memory 78 to the ID code and car number included in the data received at that point of time (step S18). Thereafter, the controller 59 resets the counter to 0 (step S19) and waits for the next data to be received.

According to the above processing, ID codes and car numbers are changed when the electric-train model 50 serving as a drive receives the remote-control data including a rewrite designation code three times consecutively and operations of the motor 58 are controlled in accordance with motor control information only when the ID code and car number included in the data for driving the motor 58 coincide with each other when the data is received.

In the case of the above embodiment, ID codes and car numbers are simultaneously changed. However, it is also allowed to separately perform change of ID codes and change of car numbers by separately generating a command for changing ID codes and a command for changing car numbers. Moreover, it is allowed to first compare the ID code in received data with the ID code set to a drive (step S12) and then decide a command (step S11) so that car numbers of only a drive to which the ID code same as that of a transmitter is set can be changed. Furthermore, though a case is described in which identification information is changed when receiving identification-information-change designation data three times consecutively, it is allowed to change the identification information when receiving the data once or three times or more.

Figure 11A:
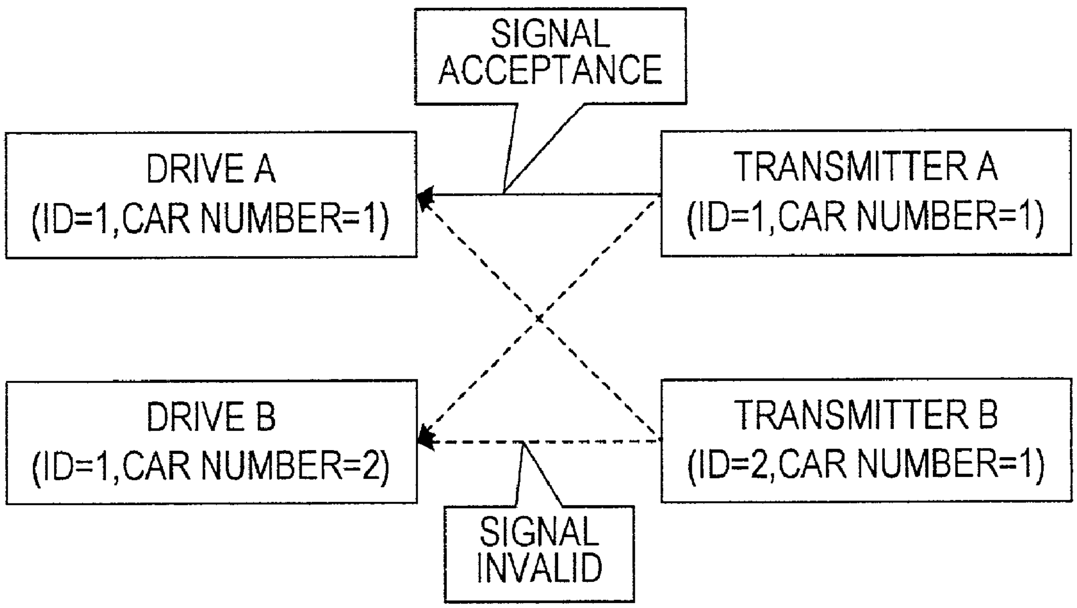
FIGS. 11A and 11B are illustrations showing relations between transmitters and drives corresponding to identification-information set states.
Figure 11B:
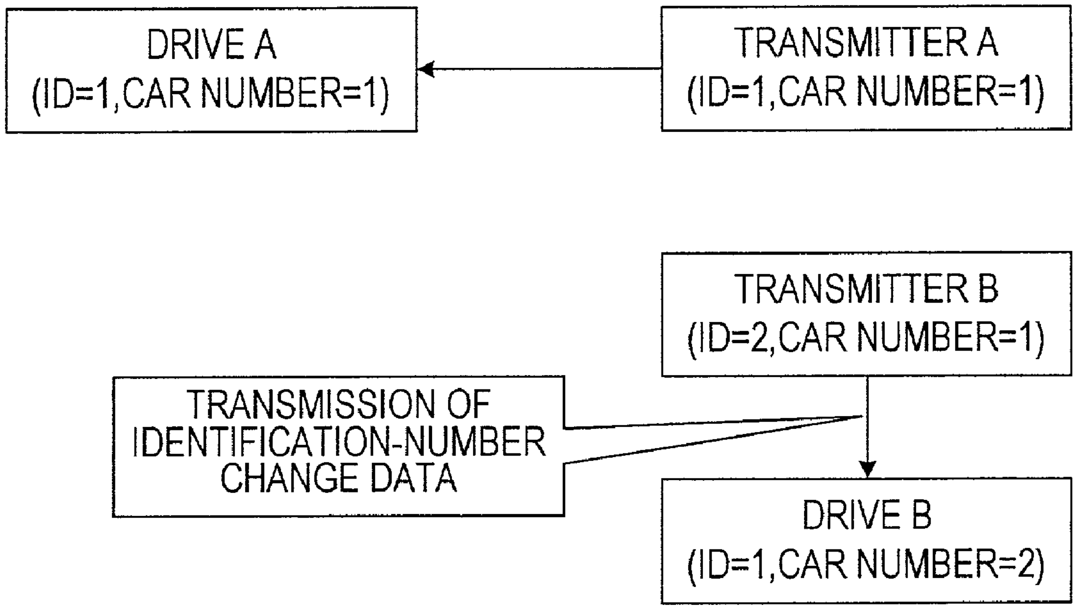
Figure 12A:
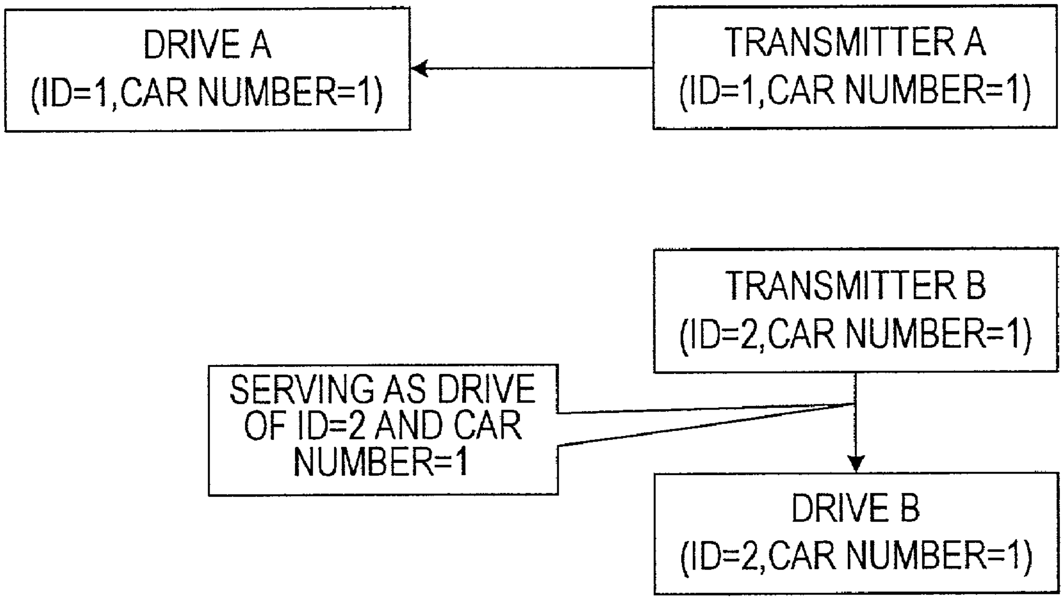
FIGS. 12A and 12B are illustrations showing other relations between transmitters and drives corresponding to identification-information set states.
Figure 12B:
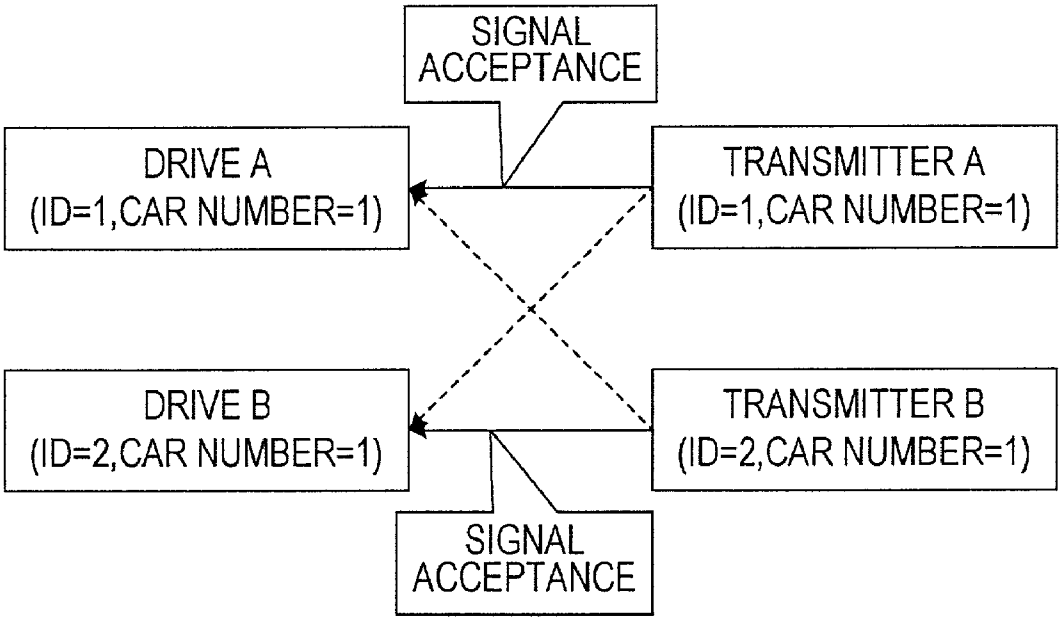

FIGS. 11A and 11B and FIGS. 12A and 12B illustrate operation states when two transmitters and two drives are used. In FIG. 11A, the transmitter A can control the drive A having the same an ID code and a car number as its own. But the transmitter B can control neither drive A nor drive B. By transmitting identification-information change data from the transmitter B to the drive B (FIG. 11B), the identification information for the drive B is changed to the identification information for the transmitter B (FIG. 12A). As a result, the transmitters A and B can respectively control a drive having the same identification information as the information for its own (FIG. 12B).

The present invention is not restricted to the above embodiment but it can be embodied by various embodiments. For example, a drive is not restricted to a train but it can use any one of embodiments simulating various movable bodies. A transmitter can use a portable type or fixed type. Moreover, it is allowed to use a portable unit such as a portable game machine or portable telephone as a transmitter by installing a specific program in the game machine or portable telephone.

A drive is not restricted to a unit simulating a train but it is allowed to include various units. It is allowed to control sections different from each other of an integrally constituted toy or model as drives different from each other.

As described above, according to the present invention, it is possible for a user to set the identification information set to a drive by a transmitter. Therefore, it is unnecessary to perform the production management and stock management of drives in accordance with the type of identification information and thus, labors required for production, circulation, and sale of drives can be reduced. A user does not have to always prepare special components for change of identification information and therefore, the user can easily enjoy remove control. Moreover, a transmitter can use at least some of circuits for transmitting operation control data to a drive for transmission of identification-information change data and a drive can use at least some of circuits for receiving operation control data for reception of identification-information change data. Therefore, it is possible to reduce the numbers of components of a transmitter and a drive and contribute to reduction of the transmitter and drive in cost and size.

What is claimed is:

1. A system for remote controlling comprising:
- a controlled device;
- a remote control for remotely controlling said controlled device;
- said remote controller comprising:
  - a transmitter;
  - a user input unit for accepting user input;
  - a data generator, responsive to said user input unit, for generating a data set having a predefined structure and driving said transmitter to transmit said data set, said data set including:

identification data for relating said transmitter to said controlled device, said identification data including:

transmitter specifying data at a first data set position of said predefined structure, for identifying said transmitter from among a plurality of transmitters; and controlled device specifying data at a second data set position of said predefined structure, for identifying said controlled device from among a plurality of controlled devices;

operation control data for controlling operations of said controlled device in conjunction with said controlled device specifying data at said second data set position corresponding to stored identification data in said controlled device; and discrimination data for discriminating whether said controlled device specifying data at said second data set position enables control by said operation control data or replaces said stored identification data; and said data generator independently changing each of said transmitter specifying data and said controlled device specifying data, included in said identification data, in accordance with operation of said input unit by the user; and said controlled device comprising:

a receiver for receiving said data set transmitted by said transmitter;

a data storage containing stored identification data assigned to said controlled device;

a first discriminator for discriminating whether said discrimination data of said data set received relates to operation control data or changing said stored identification data;

a second discriminator for comparing said identification data included at said first and second data set positions in said data set received with said stored identification data and determining that identification correspondence exists when said identification data of said data set received and said stored identification data correspond;

a controller for executing operation control of said controlled device in accordance wit said operation control data of said data set received in response to:

said first discriminator determining that said discrimination data of said data set received relates to operation control data; and said second discriminator determining that identification correspondence exists; and an identification changer for replacing said stored identification data with said identification data of said data set received in response to said first discriminator determining that said discrimination data of said data set received relates to changing said stored identification data.

2. The system of claim 1 wherein:

said user input unit includes an identification rewrite input for setting by the user;

said data generator generates a rewrite designation code as said discrimination data in response to said identification rewrite input being set by the user; and said first discriminator determines that said discrimination data relates to changing said stored identification data when said discrimination data corresponds to said rewrite designation code.

3. The system of claim 2 wherein:

said user input unit includes a controlled object identification input for setting by the user; and said data generator generates said controlled device specifying data in accordance wit said controlled object identification input.

4. The system of claim 3 wherein:

said user input unit includes a transmitter identification input for setting by the user; and said data generator generates said transmitter specifying data in accordance wit said transmitter identification input.

5. The system of claim 4 wherein:

said user input unit includes operation control inputs for setting by the user; and said data generator generates said operation control data at a third data set position of said predefined structure in accordance with said operation control inputs.

6. The system of claim 5 further comprising a shielded housing for enclosing said controlled object and transmitting said data set to said controlled abject with said discrimination data of said data set relating to changing said stored identification data such that transmission of said data set is restricted to said shield housing so that other controlled objects do not have stored identification data replaced with said identification data of said data set.

7. The system of claim 6 wherein said transmitter includes:

a first transmitter for transmitting said data set with said discrimination data relating to changing said stored identification data into said shielded housing: and a second transmitter for transmitting said data set without said discrimination data relating to changing the stored identification data outside said shielded housing.

8. The system of claim 1 further comprising a shielded housing for enclosing said controlled object and transmitting said data set to said controlled object with said discrimination data of the data set relating to changing the stored identification data such that transmission of said data set is restricted to said shield housing so that other controlled objects do not have stored identification data replaced with the identification data of the data set.

9. The system of claim 8 wherein said transmitter includes:

a first transmitter for transmitting said data set with said discrimination data relating to changing the stored identification data into said shielded housing: and a second transmitter for transmitting said data set without said discrimination data relating to changing the stored identification data outside said shielded housing.

10. A remote control for remotely controlling a controlled device, comprising:

a transmitter;

a user input unit for accepting user input;

a data generator, responsive to said user input unit, for generating a data set having a predefined structure and driving said transmitter to transmit said data set, said data set including:

identification data for relating the transmitter to said controlled device, said identification data including:

transmitter specifying data at a first data set position of said predefined structure, for identifying said transmitter from among a plurality of transmitters; and controlled device specifying data at a second data set position of said predefined structure, for identifying said controlled device from among a plurality of controlled devices;

operation control data for controlling operations of said controlled device in conjunction with said controlled device specifying data at said second data set position corresponding to stored identification data in said controlled device; and discrimination data for discriminating whether said controlled device specifying data at said second data set position enables control by said operation control data or replaces said stored identification data; and said data generator independently changing each of said transmitter specifying data and said controlled device specifying data, included in said identification data, in accordance with operation of said input unit by the user.

11. The remote control of claim 10 wherein:

said user input unit includes an identification rewrite input for setting by the user;

said data generator generates a rewrite designation code as said discrimination data in response to said identification rewrite input being set by the user; and said first discriminator determines that said discrimination data relates to changing said stored identification data when said discrimination data corresponds to said rewrite designation code.

12. The remote control of claim 11 wherein:

said user input unit includes a controlled object identification input for setting by the user; and said data generator generates said controlled device specifying data in accordance with said controlled object identification input.

13. The remote control of claim 12 wherein:

said user input unit includes a transmitter identification input for setting by the user; and said data generator generates said transmitter specifying data in accordance with said transmitter identification input.

14. The remote control of claim 13 wherein:

said user input unit includes operation control inputs for setting by the user; and said data generator generates said operation control data at a third data set position of said predefined structure in accordance with said operation control inputs.

15. The remote control of claim 14 further comprising a shielded housing for enclosing said controlled object and transmitting said data set to said controlled object with said discrimination data of said data set relating to changing said stored identification data such that transmission of said data set is restricted to said shield housing so that other controlled objects do not have stored identification data replaced with said identification data of said data set.

16. The remote control of claim 15 wherein said transmitter includes:

a first transmitter for transmitting said data set wit said discrimination data relating to changing said stored identification data into said shielded housing: and a second transmitter for transmitting said data set without said discrimination data relating to changing said stored identification data outside said shielded housing.

17. The remote control of claim 10 further comprising a shielded housing for enclosing said controlled object and transmitting said data set to said controlled object with said discrimination data of said data set relating to changing said stored identification data such that transmission of said data set is restricted to said shield housing so that other controlled objects do not have stored identification data replaced with said identification data of said data set.

18. The remote control of claim 17 wherein said transmitter includes:

a first transmitter for transmitting said data set with said discrimination data relating to changing said stored identification data into said shielded housing: and a second transmitter for transmitting said data set without said discrimination data relating to changing said stored identification data outside said shielded housing.

19. A controlled device which is remotely controlled by a remote controller having a transmitter, comprising:

a receiver for receiving a data set transmitted by said transmitter of said remote controller, said data set having a predefined structure, said data set including:

identification data for relating the transmitter to said controlled device, said identification data including:

transmitter specifying data at a first data set position of said predefined structure, for identifying said transmitter from among a plurality of transmitters; and controlled device specifying data at a second data set position of said predefined structure, for identifying said controlled device from among a plurality of controlled devices;

operation control data for controlling operations of said controlled device in conjunction with said controlled device specifying data at said second data set position corresponding to stored identification data in said controlled device; and discrimination data for discriminating whether said controlled device specifying data at said second data set position enables control by said operation control data or replaces said stored identification data;

a data storage containing stored identification data assigned to said controlled device;

a first discriminator for discriminating whether said discrimination data of said data set received relates to operation control data or changing said stared identification data;

a second discriminator for comparing said identification data included at said first and second data set positions in said data set received with said stored identification data and determining that identification correspondence exists when said identification data of said data set received and said stored identification data correspond;

a controller for executing operation control of said controlled device in accordance with said operation control data of said data set received in response to:

said first discriminator determining that said discrimination data of said data set received relates to operation control data; and said second discriminator determining that identification correspondence exists; and an identification changer for replacing said stored identification data with said identification data of said data set received in response to said first discriminator determining that said discrimination data of said data set received relates to changing said stored identification data.

* * * * *